United States Patent
Hussain et al.

(10) Patent No.: US 10,352,430 B2
(45) Date of Patent: Jul. 16, 2019

(54) INSULATED VEHICLE WALL STRUCTURES

(71) Applicant: FORD GLOBAL TECHNOLOGIES, LLC, Dearborn, MI (US)

(72) Inventors: Quazi Hussain, Holland, OH (US); William Samuel Schwartz, Pleasant Ridge, MI (US); Mark John Jennings, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 344 days.

(21) Appl. No.: 14/643,226

(22) Filed: Mar. 10, 2015

(65) Prior Publication Data
US 2016/0265644 A1    Sep. 15, 2016

(51) Int. Cl.
*B60R 13/08*  (2006.01)
*F16H 57/02*  (2012.01)
*F16H 57/029*  (2012.01)

(52) U.S. Cl.
CPC ............. *F16H 57/02* (2013.01); *B60R 13/08* (2013.01); *F16H 57/029* (2013.01); *B60R 13/0876* (2013.01)

(58) Field of Classification Search
CPC .... F01P 3/20; F01P 11/04; F01P 11/06; F01P 2007/146; F01P 2060/08; F16H 57/02; F16H 57/029; B60R 13/08; B60R 13/0876
USPC ....................................... 123/41.01
See application file for complete search history.

(56) References Cited

U.S. PATENT DOCUMENTS

| | | | | |
|---|---|---|---|---|
| 4,838,235 A * | 6/1989 | Kawamura | ............. | F02B 77/11 123/193.3 |
| 5,477,676 A | 12/1995 | Benson et al. | | |
| 5,590,524 A * | 1/1997 | Moore, III | ............ | F01N 13/102 181/240 |
| 5,816,043 A * | 10/1998 | Wolf | ....................... | F01N 13/14 138/149 |
| 5,981,082 A * | 11/1999 | Pirchl | ...................... | F16L 59/07 228/59 |
| 7,000,584 B1 * | 2/2006 | Wynveen | ................... | F02F 1/16 123/193.2 |
| 8,166,926 B2 | 5/2012 | Susaki et al. | | |
| 8,635,860 B1 * | 1/2014 | Robinson | ................ | F02B 77/11 60/298 |
| 2006/0118158 A1 | 6/2006 | Zhang et al. | | |
| 2007/0122568 A1 * | 5/2007 | Blomeling | .......... | B60R 13/0838 428/31 |
| 2009/0322096 A1 * | 12/2009 | Errera | ........................ | F01N 5/04 290/1 A |
| 2010/0042279 A1 * | 2/2010 | Thompson | ................ | B60K 6/48 701/22 |
| 2012/0160468 A1 * | 6/2012 | Larsson | ................. | H01L 23/367 165/185 |
| 2013/0301220 A1 * | 11/2013 | Hotta | .................. | H05K 7/20218 361/699 |
| 2014/0222275 A1 | 8/2014 | Ohsumi et al. | | |

* cited by examiner

*Primary Examiner* — Jacob M Amick
*Assistant Examiner* — Charles Brauch
(74) *Attorney, Agent, or Firm* — Carlson, Gaskey & Olds

(57) ABSTRACT

A vehicle subsystem according to an exemplary aspect of the present discourse includes, among other things, a wall structure and a thermal resistance feature internal to the wall structure and configured to inhibit heat loss through the wall structure.

19 Claims, 3 Drawing Sheets

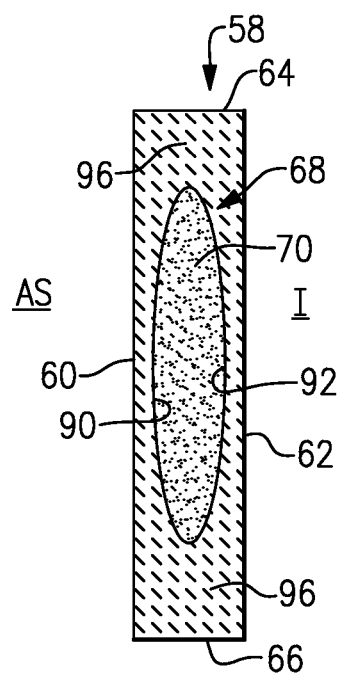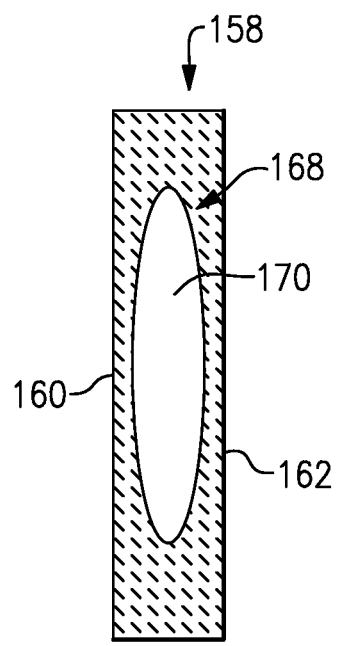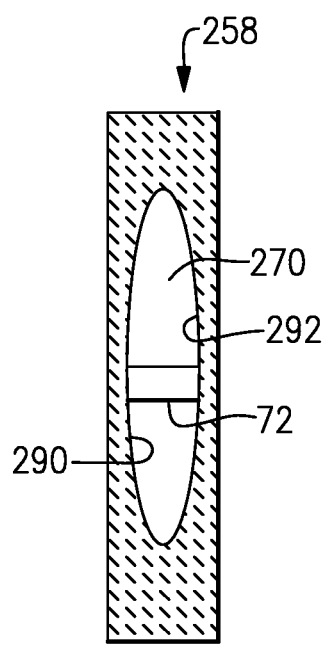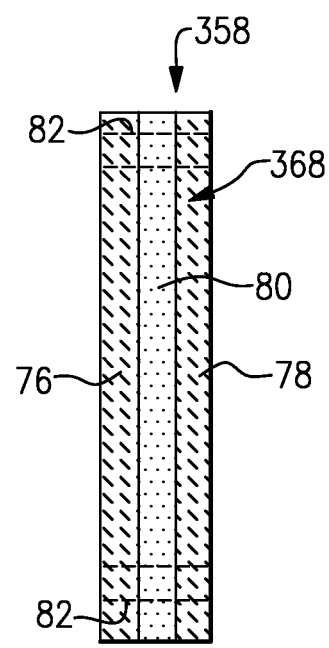

INSULATED VEHICLE WALL STRUCTURES

TECHNICAL FIELD

This disclosure relates to a vehicle subsystem. A wall structure of the vehicle subsystem includes a thermal resistance feature configured to inhibit heat loss through the wall structure.

BACKGROUND

Modern day vehicles include numerous components that attain relatively high temperatures during the course of vehicle operation. The engine and the transaxle are two examples of such vehicle components. At elevated temperatures of the engine and transaxle, the losses caused by friction are relatively low resulting in reduced fuel consumption. However, the engine and transaxle lose heat to their surroundings when the vehicle is turned off. Over time, these components slowly cool down and eventually reach equilibrium with the ambient temperature. When the vehicle is subsequently turned on in this cooled down state, the losses due to friction are relatively high, thereby increasing fuel consumption compared to the elevated temperature state.

After the cold start, the engine coolant first needs to warm up before it can provide heat to the vehicle cabin, thereby causing occupant discomfort in winter. Moreover, to satisfy emission requirements for a hybrid electric vehicle (HEV), a cold engine requires the vehicle subsystem controller to keep the engine running regardless of propulsion needs until a prescribed engine temperature is reached. This means the HEV system functionality is not utilized during this time and possible fuel economy gains are not achieved.

SUMMARY

A vehicle subsystem according to an exemplary aspect of the present discourse includes, among other things, a wall structure and a thermal resistance feature internal to the wall structure and configured to inhibit heat loss through the wall structure.

In a further non-limiting embodiment of the foregoing vehicle subsystem, the wall structure is part of an engine.

In a further non-limiting embodiment of either of the foregoing vehicle subsystems, the wall structure is part of a transaxle.

In a further non-limiting embodiment of any of the foregoing vehicle subsystems, the thermal resistance feature includes an air pocket formed inside the wall structure.

In a further non-limiting embodiment of any of the foregoing vehicle subsystems, the air pocket has been evacuated of air.

In a further non-limiting embodiment of any of the foregoing vehicle subsystems, a rib extends across the air pocket between at least two solid surfaces of the wall structure.

In a further non-limiting embodiment of any of the foregoing vehicle subsystems, the thermal resistance feature includes insulation that is sandwiched between a first layer and a second layer of the wall structure.

In a further non-limiting embodiment of any of the foregoing vehicle subsystems, at least one fastener extends through the first layer, the insulation and the second layer.

In a further non-limiting embodiment of any of the foregoing vehicle subsystems, the wall structure includes an external wall, an internal wall, a top wall and a bottom wall.

In a further non-limiting embodiment of any of the foregoing vehicle subsystems, the thermal resistance feature is disposed between the external wall and the internal wall.

In a further non-limiting embodiment of any of the foregoing vehicle subsystems, the wall structure includes at least one solid section adjacent to the thermal resistance feature.

A vehicle according to another exemplary aspect of the present disclosure includes, among other things, an engine, a transaxle selectively driven by the engine and at least one of the engine and the trans axle including a wall structure having a thermal resistance feature built into the wall structure and configured to inhibit heat loss out of the engine or the transaxle.

In a further non-limiting embodiment of the foregoing vehicle, the thermal resistance feature includes an air pocket formed inside the wall structure.

In a further non-limiting embodiment of either of the foregoing vehicles, the air pocket extends between an external wall and an internal wall of the wall structure.

In a further non-limiting embodiment of any of the foregoing vehicles, a rib extends across the air pocket between a first solid surface and a second solid surface.

In a further non-limiting embodiment of any of the foregoing vehicles, the first solid surface and the second solid surface are internal surfaces of the wall structure.

In a further non-limiting embodiment of any of the foregoing vehicles, the air pocket has been evacuated of air.

In a further non-limiting embodiment of any of the foregoing vehicles, the thermal resistance feature includes insulation that is sandwiched between a first layer and a second layer of the wall structure.

In a further non-limiting embodiment of any of the foregoing vehicles, at least one fastener extends through the first layer, the insulation and the second layer.

In a further non-limiting embodiment of any of the foregoing vehicles, an electric machine is configured to selectively drive the transaxle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 illustrates a wall structure of a vehicle subsystem according to a first embodiment of this disclosure.

FIG. 4 illustrates a wall structure according to a second embodiment of this disclosure.

FIG. 5 illustrates wall structure according to another embodiment of this disclosure.

FIG. 6 illustrates yet another exemplary wall structure.

DETAILED DESCRIPTION

This disclosure details a vehicle subsystem. The vehicle subsystem includes a wall structure and a thermal resistance feature inside the wall structure. The thermal resistance feature is configured to inhibit heat loss through the wall structure. In some embodiments, the wall structure is part of a vehicle engine. In other embodiments, the wall structure is part of a vehicle transaxle. These and other features are discussed in greater detail in the following paragraphs of this detailed description.

Figure 1:
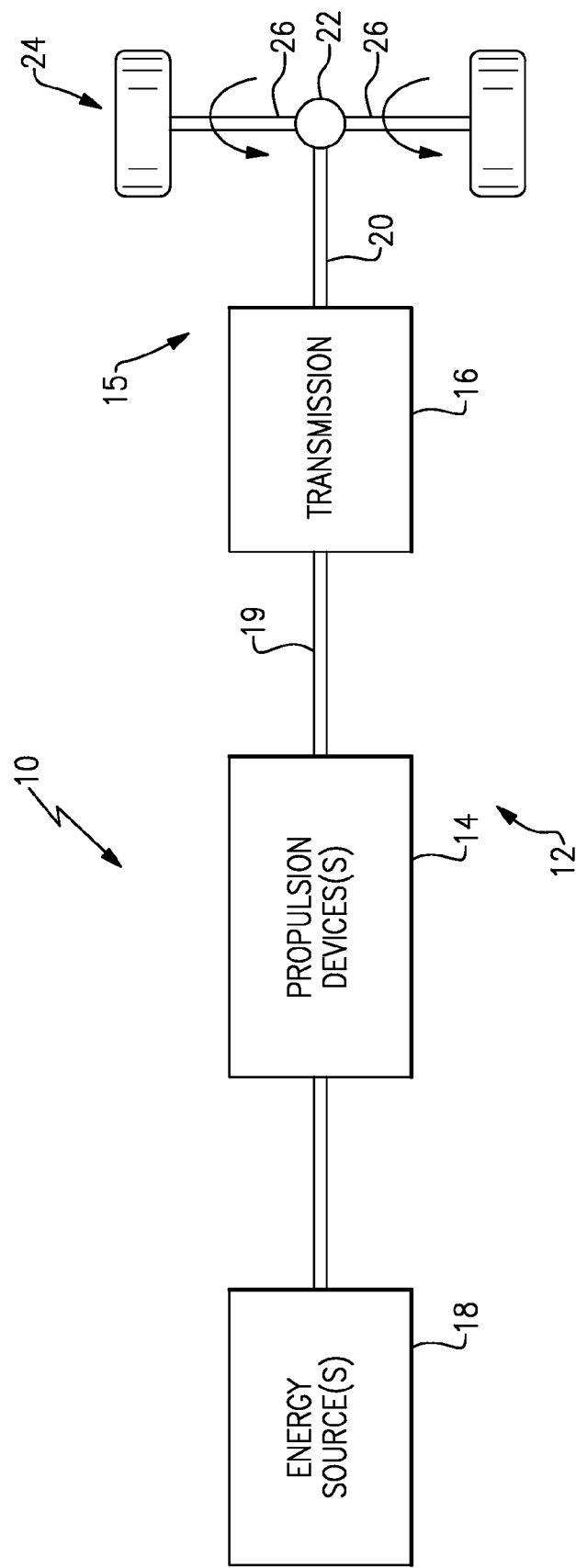
FIG. 1 schematically illustrates a powertrain of a vehicle.

FIG. 1 schematically illustrates a vehicle 10. This disclosure is applicable to any type of vehicle. For example, the vehicle 10 could be a conventional vehicle that is powered by an internal combustion engine, or could be configured as a hybrid electric vehicle that is powered by one or more electric machines in addition to the internal combustion engine.

The exemplary vehicle 10 includes a powertrain 12. The powertrain 12 may include a propulsion device 14 and a transaxle 15 that is selectively driven by the propulsion device 14. The propulsion device 14 may be employed as an available drive source for the vehicle 10. The propulsion device 14 may include an internal combustion engine if the vehicle 10 is configured as a conventional vehicle. Alternatively, the propulsion device 14 could include an internal combustion engine and an electric machine (i.e., an electric motor, a generator or a combined motor/generator) if the vehicle 10 is configured as an electrified vehicle.

The transaxle 15 includes a transmission 16. The transmission 16, which is shown schematically, may include a gearbox having multiple gear sets (not shown) that are selectively operated using different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission input shaft 19 and a transmission output shaft 20 of the transaxle 15. The transmission 16 may alternatively be controlled to achieve an infinite number of ratios. These ratios can be achieved through mechanical reconfiguration as in a continuously variable transmission (CVT) or by electrical coordinate of the speeds of electric machines as in an electrically continuously variable transmission (eCVT). The transmission 16 may be automatically shifted from one ratio to another based on various vehicle and ambient operating conditions by an associated control module. The transmission 16 then provides powertrain output torque to the transmission output shaft 20.

The transmission output shaft 20 may optionally be connected to a differential 22 of the transaxle 15. The differential 22 drives a pair of wheels 24 via respective axles 26 that are connected to the differential 22 to propel the vehicle 10. The transaxle 15 may be configured as either a front wheel drive or rear wheel drive platform.

One or more energy sources 18 may supply power to the propulsion device(s) 14. The energy source 18 may include a fuel system if the propulsion device 14 is an engine and/or a high voltage battery pack if the propulsion device 14 is an electric machine. For example, an engine is configured to consume fuel (i.e., gasoline, diesel, etc.) to produce a motor output, whereas the high voltage battery pack is configured to output and receive electrical energy that is consumed by the electric machine to produce a motor output. In one non-limiting embodiment, the vehicle 10 may include both a fuel system and the high voltage battery pack as available energy sources 18 where the vehicle 10 is configured as a hybrid electric vehicle.

Figure 2:
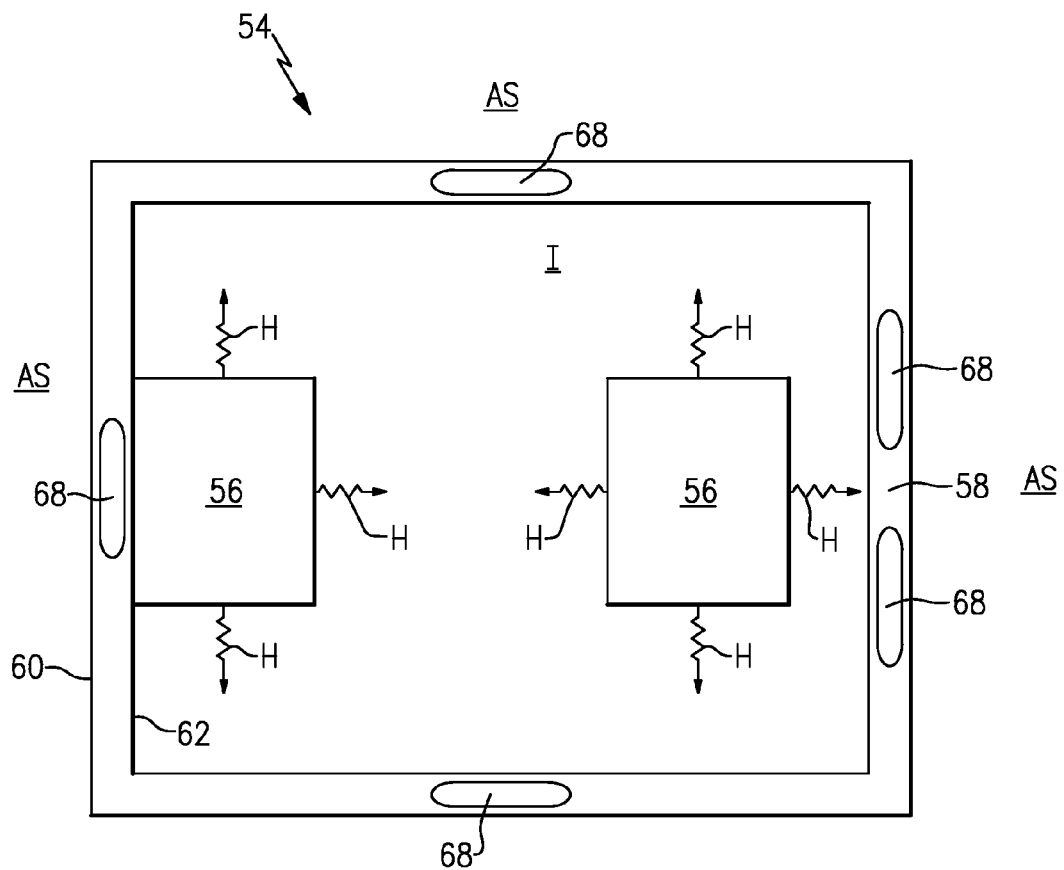
FIG. 2 illustrates a vehicle subsystem.

FIG. 2 is a highly schematic depiction of a vehicle subsystem 54 that can be incorporated into a vehicle. For example, the vehicle subsystem 54 could be employed within the vehicle 10 of FIG. 1. In one non-limiting embodiment, the vehicle subsystem 54 is a heat generating vehicle subsystem, such as an engine or a transaxle. The vehicle subsystem 54 may include one or more components 56 (two shown in this non-limiting embodiment) that generate heat H during operation of the vehicle subsystem 54. The components 56 may include any part that creates friction during operation of the vehicle subsystem 54, including but not limited to, cylinders, mating parts, gears, clutches, brakes, etc.

The vehicle subsystem 54 includes a wall structure 58 that surrounds the components 56. The components 56 may be in direct contact with the wall structure 58, or could be spaced away from the wall structure 58 in an indirect thermal connection to the wall structure 58. Heat H generated by the components 56 is transferred to the wall structure 58 through these direct or indirect pathways and is subsequently lost to the ambient surroundings AS. The wall structure 58 may establish an interior I for housing the components 56. The interior I may contain a gaseous or a liquid medium or any combination of mediums.

The wall structure 58 is configured to retain the heat H generated by the vehicle subsystem 54 within the interior I. In one embodiment, one or more thermal resistance features 68 may be formed inside the wall structure 58 to inhibit the loss of the heat H from the interior I to ambient surroundings AS. For example, each thermal resistance feature 68 acts as a suitable thermal barrier so the vehicle subsystem 54 losses heat H to the ambient surroundings AS at a slower rate compared to standard wall structures Inhibiting heat loss in this manner allows the vehicle subsystem 54 to begin operating the components 56 at a temperature greater than the ambient temperature of the ambient surroundings AS after the heat generating components 56 have been inactive for a long duration of time. With this inhibiting heat loss feature, the components 56 warm up at a rate faster than standard wall structures. Therefore, improved fuel economy may be achieved because friction losses are lower at the higher temperatures. This also means heat may be provided to the vehicle cabin much sooner and satisfy key thermal comfort metrics. Various wall structures having built-in thermal resistance features that inhibit heat loss are described below with reference to FIGS. 3-6.

FIG. 3 illustrates an exemplary wall structure 58 adapted to inhibit heat loss out of a vehicle subsystem. The wall structure 58 may include an external wall 60, an internal wall 62, a top wall 64, and a bottom wall 66. The exterior wall 60 faces toward the ambient surroundings AS of the vehicle subsystem 54, and the internal wall 62 faces toward the interior I of the vehicle subsystem 54 (see also FIG. 2).

A thermal resistance feature 68 may be built into the wall structure 58. For example, in one non-limiting embodiment, the thermal resistance feature 68 is disposed inside the wall structure 58 between the external wall 60 and the internal wall 62. The thermal resistance feature 68 may also be disposed between the top wall 64 and the bottom wall 66.

In one embodiment, the thermal resistance feature 68 includes an air pocket 70 disposed inside the wall structure 58. The air pocket 70 splits the wall structure 58 into a multi-layered wall with an air gap extending between the layers. The air pocket 70 may extend between a first surface 90 of the external wall 60 and a second surface 92 of the internal wall 62. In one embodiment, both the first surface 90 and the second surface 92 are solid, internal surfaces of the wall structure 58.

The air pocket 70 is a relatively poor conductor of heat and thus inhibits heat loss through the wall structure 58 by increasing the thermal resistance from the internal wall 62 toward the external wall 60. It should be understood that the wall structure 58 could include one or more air pockets 70 periodically disposed throughout the wall structure 58. In other words, the wall structure 58 may include solid sections 96 in addition to the air pocket 70.

The wall structure 58 may be made using a metallic material. In one embodiment, the wall structure 58 is made of aluminum. In another embodiment, the wall structure 58 is made of iron. Other high strength and high rigidity materials are also contemplated as within the scope of this disclosure.

FIG. 4 illustrates another exemplary wall structure 158. In this disclosure, like reference numbers designate like elements where appropriate and reference numerals with the addition of 100 or multiples thereof designate modified elements that are understood to incorporate the same features and benefits of the corresponding original elements.

In this exemplary embodiment, the wall structure 158 is similar to the wall structure 58 of FIG. 3 and includes a thermal resistance feature 168 configured as a vacuum pocket 170. In this embodiment, the vacuum pocket 170 has been evacuated of air. Evacuating the air within the vacuum pocket 170 substantially eliminates thermal conduction thus leaving thermal radiation as the only heat transfer mechanism that can occur across the vacuum pocket 170. The vacuum pocket 170 may therefore further reduce heat loss that can occur through the wall structure 158 from the internal wall 162 toward the external wall 160.

FIG. 5 illustrates yet another wall structure 258. The wall structure 258 is similar to the wall structure 58 of FIG. 3 but includes a rib 72 that extends across an air pocket 270 formed inside the wall structure 258. In one embodiment, the rib 72 extends between a first solid surface 290 and a second solid surface 292 that surround the air pocket 270. The rib 72 increases the strength and rigidity of the wall structure 258. Although a single rib 72 is shown, multiple ribs 72 could extend across the air pocket 270. In one non-limiting embodiment, the rib 72 is made of a non-conductive material. In another non-limiting embodiment, the rib 72 is made from the same material as the wall structure 258.

Another wall structure 358 is illustrated in FIG. 6. In this embodiment, the wall structure 358 includes a first layer 76, a second layer 78 and a thermal resistance feature 368 between the first layer 76 and the second layer 78. In one embodiment, the thermal resistance feature 368 includes insulation 80 sandwiched between the first layer 76 and the second layer 78. The insulation 80 may be held in place using one or more fasteners 82 that extend through each of the first layer 76, the insulation 80 and the second layer 78. The insulation 80 is adapted to inhibit heat loss through the wall structure 358, such as in a direction extending from the second layer 78 toward the first layer 76 (i.e., toward surrounding atmosphere).

The various embodiments of this disclosure incorporate thermal resistance features inside the wall structures of heat generating vehicle subsystems. The thermal resistance features exhibit increased thermal resistance for reducing heat loss out of the wall structures. Reducing heat loss in this manner allows vehicle subsystem operation to begin at a higher than ambient temperatures to provide improved fuel economy.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle subsystem, comprising:
   a heat generating component;
   an engine or transaxle wall structure that establishes an enclosed interior that houses said heat generating component; and
   a plurality of thermal resistance features internal to said wall structure and configured to inhibit heat loss through said wall structure, wherein said plurality of thermal resistance features are discrete features that do not share a common wall,
   wherein said wall structure is separate from an outer wall of said heat generating component.

2. The vehicle subsystem as recited in claim 1, wherein each of said plurality of thermal resistance features includes an air pocket formed inside said wall structure.

3. The vehicle subsystem as recited in claim 2, wherein said air pocket has been evacuated of air.

4. The vehicle subsystem as recited in claim 2, comprising a rib that extends across said air pocket between at least two solid surfaces of said wall structure.

5. The vehicle subsystem as recited in claim 1, wherein each of said plurality of thermal resistance features includes insulation that is sandwiched between a first layer and a second layer of said wall structure.

6. The vehicle subsystem as recited in claim 5, comprising at least one fastener extending through said first layer, said insulation and said second layer.

7. The vehicle subsystem as recited in claim 1, wherein said wall structure includes an external wall, an internal wall, a top wall and a bottom wall.

8. The vehicle subsystem as recited in claim 7, wherein each of said plurality of thermal resistance features is disposed between said external wall and said internal wall.

9. The vehicle subsystem as recited in claim 1, wherein said wall structure includes at least one solid section adjacent to each of said plurality of thermal resistance features.

10. A vehicle, comprising:
    an engine;
    a transaxle selectively driven by said engine; and
    said engine and said transaxle each including a wall structure having a thermal resistance feature built into said wall structure and configured to inhibit heat loss out of said engine or said transaxle,
    wherein said wall structure is separate from an outer wall of a heat generating component that is housed inside an enclosed interior of said wall structure
    wherein said thermal resistance feature includes an evacuated air pocket formed inside said wall structure.

11. The vehicle as recited in claim 10, wherein said evacuated air pocket extends between an external wall and an internal wall of said wall structure.

12. The vehicle as recited in claim 11, comprising a rib that extends across said evacuated air pocket between a first solid surface and a second solid surface.

13. The vehicle as recited in claim 12, wherein said first solid surface and said second solid surface are internal surfaces of said wall structure.

14. The vehicle as recited in claim 10, wherein said thermal resistance feature includes insulation that is sandwiched between a first layer and a second layer of said wall structure.

15. The vehicle as recited in claim 14, comprising at least one fastener extending through said first layer, said insulation and said second layer.

16. The vehicle as recited in claim 10, comprising an electric machine configured to selectively drive said transaxle.

17. A vehicle, comprising:
an engine;
a transaxle selectively driven by said engine;
said engine or said transaxle including a wall structure that is an integral portion of an enclosure of said engine or said transaxle that houses at least one heat generating component of said engine or transaxle; and
an evacuated air pocket enclosed inside said wall structure and configured to inhibit heat loss out of said engine or said transaxle,
wherein said wall structure is separate from an outer wall of said at least one heat generating component,
wherein said evacuated air pocket is disposed between an external wall of said wall structure that faces toward an ambient surrounding of said enclosure and an internal wall of said wall structure that faces toward an interior of said enclosure.

18. The vehicle subsystem as recited in claim 1, wherein said wall structure includes multiple wall sections and each of said multiple wall sections includes at least one of said plurality of thermal resistance features.

19. A vehicle, comprising:
a heat generating component including a gear, clutch, or brake;
a transaxle wall structure establishing an enclosed interior that houses said heat generating component; and
an evacuated air pocket formed inside a wall of said transaxle wall structure and configured to inhibit heat loss through said transaxle wall structure,
wherein said evacuated air pocket is fluidly isolated from said interior.

\* \* \* \* \*